June 13, 1933.    C. M. WEBER    1,914,058
LENS SYSTEM
Filed April 7, 1930

INVENTOR
CARL M. WEBER
BY
ATTORNEY

Patented June 13, 1933

1,914,058

UNITED STATES PATENT OFFICE

CARL M. WEBER, OF ROCHESTER, NEW YORK

LENS SYSTEM

Application filed April 7, 1930. Serial No. 442,157.

This invention relates to optical systems for sound optical trains used in sound recording and sound projecting apparatus and the object of the invention is to provide an optical system or lens assembly with which the light from the glow tube or excitor lamp may be projected onto the film with a much greater efficiency than has heretofore been possible.

This and other objects of this invention will be fully illustrated in the drawing, described in the specification and the appended claims forming a part thereof.

In the accompanying drawing.

In the several figures of the drawing like reference numerals indicate like parts.

Figure 1:
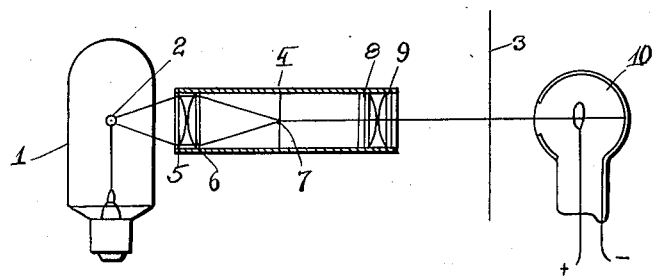
Figure 1 is a diagrammatic view of the optical train used in sound projection embodying my invention.
Figure 2:
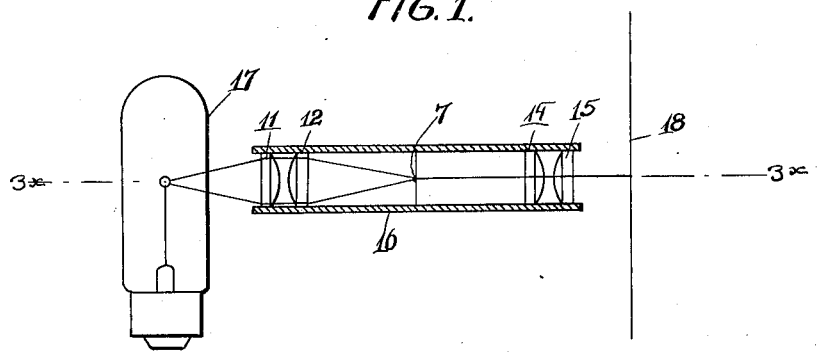
Figure 2 is a diagrammatic view of the optical train used in sound recording embodying my invention.
Figure 3:
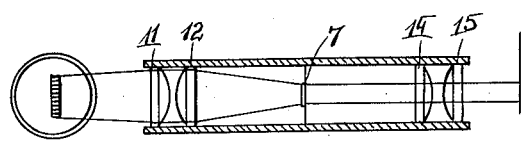
Figure 3 is a horizontal sectional view of the lens system illustrated in Figure 2, the section being taken on the line $3x$—$3x$ of Figure 2.

The heart of a sound recording and sound projection apparatus is its so-called optical projection, which in the sound projection apparatus consists of an exciter lamp 1 having a straight line filament 2. This filament lights to an exceptional brilliancy and a photographic image of this filament is focused on the moving film 3 by the lens assembly mounted in the barrel 4. This lens assembly comprises two small condenser lenses 5 and 6 followed by the light collecting lens 7. Beyond the latter lens are two objective lenses 8 and 9 which complete the assembly. The film 3 moves past the lens system at a constant rate of speed and varies the light projected onto it from the exciter lamp in a degree corresponding exactly to the photographic sound variations which are recorded on the film. This varying light falls onto the photoelectric cell, which correspondingly varies the electric current passing thru the electric circuit of which the photoelectric cell 10 forms a part.

In the optical train for sound recording the lens assembly embodying my invention is practically the same as in the sound projection apparatus and comprises the condenser lenses 11 and 12, the light collecting lens 7 and the objective lenses 14 and 15, all of which are mounted in the barrel 16. In the recording apparatus this optical system is used in connection with the glow tube 7 to which the output of the sound amplifier is applied. When the sound modulated output of the amplifier is applied to this tube the glow is alternately increased and partially extinguished. The light from the glow tube is focussed onto the film 18 by the optical system and is recorded thereon as fine lines running cross ways of the sound track, producing a series of alternate light and dark lines whose spacing and contrast depend on the frequency and intensity of the modulated current applied to the glow tube.

The light collecting and condensing lens 7 and its use in the optical trains illustrated in the figures of the drawing form the subject matter of my present invention. Heretofore only a slit of predetermined dimension was used in place of this lens in the lens system of sound recording and reproducing apparatus. It is readily seen that while such a slit serves to reduce the light source to the proper dimension corresponding to the outline of the sound record to be recorded or already recorded on the film, much of the light from the light source is lost in its passage thru the slit diaphragm and never reaches the film. In the case of the lens system for recording apparatus this loss of light results in an inefficient recording on the film of the light rays corresponding to the frequency and intensity of the modulated current and in the case of the reproducing apparatus the loss of this light results in an inefficient translation of the light record of the film in the radio amplifying circuit.

As illustrated in the several figures of the drawing the light collecting and condensing lens 7 has a cross section which is more or less semicylindrical or preferably parabolical in cross section and its plano surface 20 faces the objective lenses 8 and 9 or 14 and 15. The cross section of the lens is uniform thruout its length which is of predetermined dimension depending on the length of the light field to be projected therethru. In the lens system using an aperture or slit in place of my lens, this aperture is $\frac{3}{16}$ inch long and from .0012 to .0015 wide and my lens 7 is constructed so that its plano face will have practically these same dimensions. The plano face of the lens may also be masked so that the exposed portion of the plano side of the lens will have the above dimensions.

Figure 5:
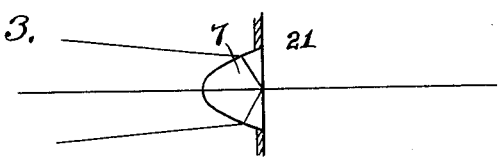
Figure 5 is an enlarged diagrammatic view of the lens used in the lens system for increasing the efficiency of the lens system in projecting a light source for sound recording or sound reproducing apparatus.
Figure 4:
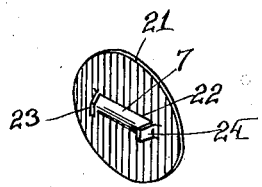
Figure 4 is an enlarged detail perspective view of the light collecting lens and its mounting used in the lens system.

The lens is mounted as illustrated in Figure 4 which shows a suitable partition 21 having an elongated opening 22 in which the lens is held by means of the prongs 23 and 24 provided at each end of the opening. Figure 5 shows how the lens 7 is supported in the opening of the partition and collects the light rays projected from the condenser lenses on its elongated curved surface on one side and are condensed into parallel rays which are projected from the plano surface of the lens to the objective lenses of the lens system. Due to the greater curved surface of the lens 4 considerably more light from the condenser lenses is collected by this lens and projected from the plano side of the lens to the objective lenses than can pass thru a slit having the same dimensions as the plano face of the lens.

I claim:

1. In a lens system for projecting a light field of predetermined dimension the combination of a condenser lens and an objective lens, a light source in focus with said condenser lens and an elongated condensing lens having the outline and dimensions of the dimensions of the predetermied light field and having a uniform cross section thruout its length with its convex surface facing the condenser lens and its plano surface facing the objective lens intermediate of said condenser and objective lens.

2. In a lens system for projecting a light field of predetermined dimension, the combination of a condenser lens, and an objective lens, an elongated condensing lens having the outline and dimensions of the dimensions of the predetermined light field and having a uniform cross section thruout its length and a width and length in proportion to the light field projected therethru, said elongated length having its convex surface facing the condenser lens and its plano surface facing the objective lens.

In testimony whereof I affix my signature.

CARL M. WEBER.